(12) United States Patent
Aoki et al.

(10) Patent No.: US 6,472,591 B2
(45) Date of Patent: Oct. 29, 2002

(54) PORTABLE COMMUNICATION TERMINAL APPARATUS WITH MUSIC COMPOSITION CAPABILITY

(75) Inventors: Eiichiro Aoki, Hamamatsu (JP); Shigehiko Mizuno, Hamamatsu (JP); Shigeki Akahori, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/863,694

(22) Filed: May 23, 2001

(65) Prior Publication Data

US 2001/0047717 A1 Dec. 6, 2001

(30) Foreign Application Priority Data

May 25, 2000 (JP) .......................... 2000-154454

(51) Int. Cl.[7] .................................................. G10H 1/42
(52) U.S. Cl. ...................... 84/611; 84/651; 84/DIG. 12
(58) Field of Search ................... 84/609–614, 649–652, 84/DIG. 12; 434/307 A

(56) References Cited

U.S. PATENT DOCUMENTS 5,451,709 A * 9/1995 Minamitaka ................ 84/609
6,018,654 A    1/2000 Valentine et al.
6,294,720 B1 * 9/2001 Aoki ........................... 84/611

FOREIGN PATENT DOCUMENTS

JP    11-252212    9/1999

* cited by examiner

*Primary Examiner*—Stanley J. Witkowski
(74) *Attorney, Agent, or Firm*—Morrison & Foerster LLP

(57) ABSTRACT

In a portable communication terminal apparatus, a transmitter and receiver conducts either of a transmission and receipt of a message. A tone generator generates a sequence of tones to sound a music melody of a song in association with either of the transmission and the receipt of the message. A music composer is provided for inputting a motif melody comprised of a rhythm and a pitch and for composing the music melody of the song based on the inputted motif melody. The music composer may automatically input either of the rhythm and the pitch of the motif melody. A display device displays the inputted the motif melody in a sequence of beat points for editing.

43 Claims, 13 Drawing Sheets

PORTABLE COMMUNICATION TERMINAL APPARATUS WITH MUSIC COMPOSITION CAPABILITY

BACKGROUND OF THE INVENTION

The present invention relates to a portable communication terminal apparatus capable of automatically composing melody data used for a ringing melody signaling an incoming call.

There has conventionally been a portable communication terminal apparatus that a user can compose melody data used for signaling an incoming call.

The portable communication terminal apparatus is, however, provided with only a small display unit and a limited number of operators, and has a drawback that composition of melody data is difficult. An automatic composing technique for composing a melody of one complete song based on a motif melody has been recently developed, and providing this automatic composing function to the portable communication terminal apparatus can easily compose melody data, but input of a motif melody which is required for automatic composition is naturally difficult by the small display unit and the limited operators.

SUMMARY OF THE INVENTION

In order to solve the above-described problem, it is an object of the present invention to enable easy automatic composition of melody data used for a ringing melody signaling an incoming call even in a portable communication terminal apparatus having only a small display and a limited number of operators.

According to a general aspect of the present invention, there is provided a portable communication terminal apparatus comprising a transmitter and receiver section that is provided for conducting either of a transmission and receipt of a message, a tone generator section that is provided for generating a sequence of tones to sound a music melody of a song in association with either of the transmission and the receipt of the message, and a music composing section that is provided for inputting a motif melody comprised of a rhythm and a pitch and for composing the music melody of the song based on the inputted motif melody.

Specifically, according to a first aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm automatic input portion for automatically inputting the rhythm of the motif melody independently from the pitch of the motif melody.

Further, according to a second aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a pitch automatic input portion for automatically generating a pitch independently from the rhythm which has been already inputted.

According to a third aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm input portion which has a grid display unit for displaying a predetermined musical interval in the form of a grid and which inputs a rhythm by selecting a position on the grid by the operation of an operator.

According to a fourth aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm display portion for displaying a rhythm of an inputted melody on a grid form which displays a predetermined musical interval in the form of a grid.

According to a fifth aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm input portion which has a display unit for displaying a predetermined musical interval in the form of a grid and a digit operator corresponding to each displayed grid position, and which inputs a rhythm to a corresponding position on the grid by the operation of the digit operator.

According to a sixth aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm input portion which has a touch panel type display unit and which inputs a rhythm by designating a position on the touch panel in the horizontal axial direction.

According to a seventh aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm input portion which has a touch panel type display unit and which inputs a pitch by designating a position on the touch panel in the vertical axial direction.

According to an eighth aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising a rhythm input portion which has a touch panel type display unit, displays a staff notation on the display unit, and inputs a pitch by designation of a position on the staff notation on the touch panel.

According to a ninth aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising an input portion which has a pitch designation operator for designating a pitch, and which inputs a rhythm based on the pitch and a predetermined unit musical note length by the sole operation of the pitch designation operator.

According to a tenth aspect of the present invention, there is provided a portable communication terminal apparatus having a music composing section for inputting a motif melody comprised of a rhythm and a pitch, and for generating a melody of one complete song based on the motif melody, the portable communication terminal apparatus comprising an input portion has a rhythm input operator and which inputs a rhythm in terms of a predetermined unit musical note length and a predetermined pitch by the operation of the rhythm input operator, and a pitch correcting portion for correcting the inputted predetermined pitch.

According to these aspects of the present invention, the small display unit and the limited number of operators can be efficiently used to quickly input a motif melody, and melody data of one complete song used for signaling an incoming call can be hence readily composed. It is to be noted that one complete song according to the present invention is of a concept including a song having a one-chorus constitution, a song having a multiple-chorus constitution, one desired block in a plurality of blocks obtained by dividing one chorus (for example, a block of a theme part) and others.

DETAILED DESCRIPTION OF THE INVENTION

Figure 1:
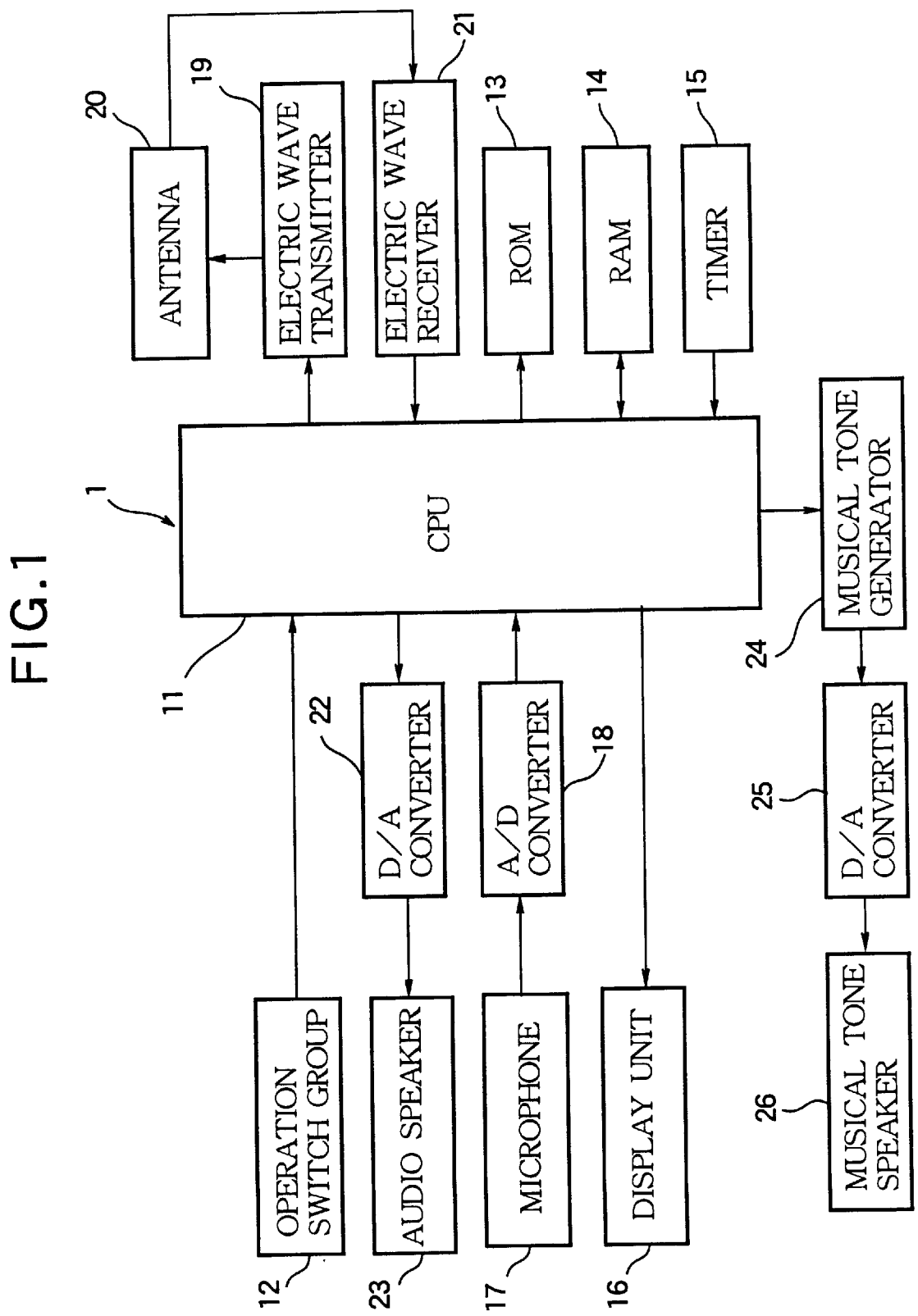
FIG. 1 is a schematic block diagram showing a hardware structure of a portable communication terminal apparatus in an embodiment according to the present invention.

FIG. 1 is a block diagram schematically showing a hardware structure of a portable communication terminal apparatus according to an embodiment.

As shown in the drawing, a CPU 11 for controlling the entire system is connected to those of an operation switch group 12 comprised of a ten key pad and various function switches, a ROM 13 for storing a control program executed by the CPU 11, various kinds of table data and others, a RAM 14 for temporarily storing performance data including data for a ringing melody signaling an incoming call or for an alarm sound, data to bed added to an email, data for BGM and others, various kinds of input information, and arithmetic operation results and the like, a timer 15 for clocking an interruption time in timer interruption processing, various kinds of time and hours, and a display unit 16 provided with, e.g., a liquid crystal display (LCD) and an light emitting diode (LED) for displaying various kinds of information.

Further, a microphone 17 for inputting sounds is connected to the CPU 11 through an A/D converter 18 for converting an analog signal output from the microphone 17 into a digital signal. Also, the CPU 11 is connected to those of an electric wave transmitter 19 which converts the inputted audio signal or various kinds of control signal into electric waves and transmits the electric waves to a non-illustrated base station through an antenna 20 and, an electric wave receiver 21 which receives the electric waves transmitted from a base station through the antenna 20 so that the electric waves are converted into an audio signal or various kinds of control signal.

Furthermore, to the CPU 11 are connected an audio speaker 23 for converting a talking of voice the counter party, i.e., an audio signal which is transmitted from a non-illustrated portable communication terminal apparatus of the counter party or a wired communication terminal apparatus (fixed telephone system) and the like through the base station, a D/A converter 22 for converting a digital audio signal from the CPU 1 into the analog audio signal, and musical tone generator 24 for generating various kinds of digital musical tone signals while changing a timbre by a timbre change command from the CPU 11. This musical tone generator may adopt any of a waveform memory system, an FM system, a physical model system, a harmonic synthesization system, a formant synthesization system, a VCO+VCF+VCA analog synthesizer system, an analog simulation system and others. Moreover, the tone generator circuit may be constituted by using exclusive hardware or it may be constituted by using a DSP and a microprogram. In addition, combinations of them may be adopted. Additionally, one circuit may be used in the time sharing manner to form a plurality of tone generation channels, or one tone generation channel may be formed by one circuit. A D/A converter 25 for converting a digital musical tone output into an analog musical tone signal is connected to the output side of the musical tone generator 24, and a musical tone speaker for converting the analog musical tone signal into actral sounds is connected to the output side of the D/A converter 25.

Figure 2:
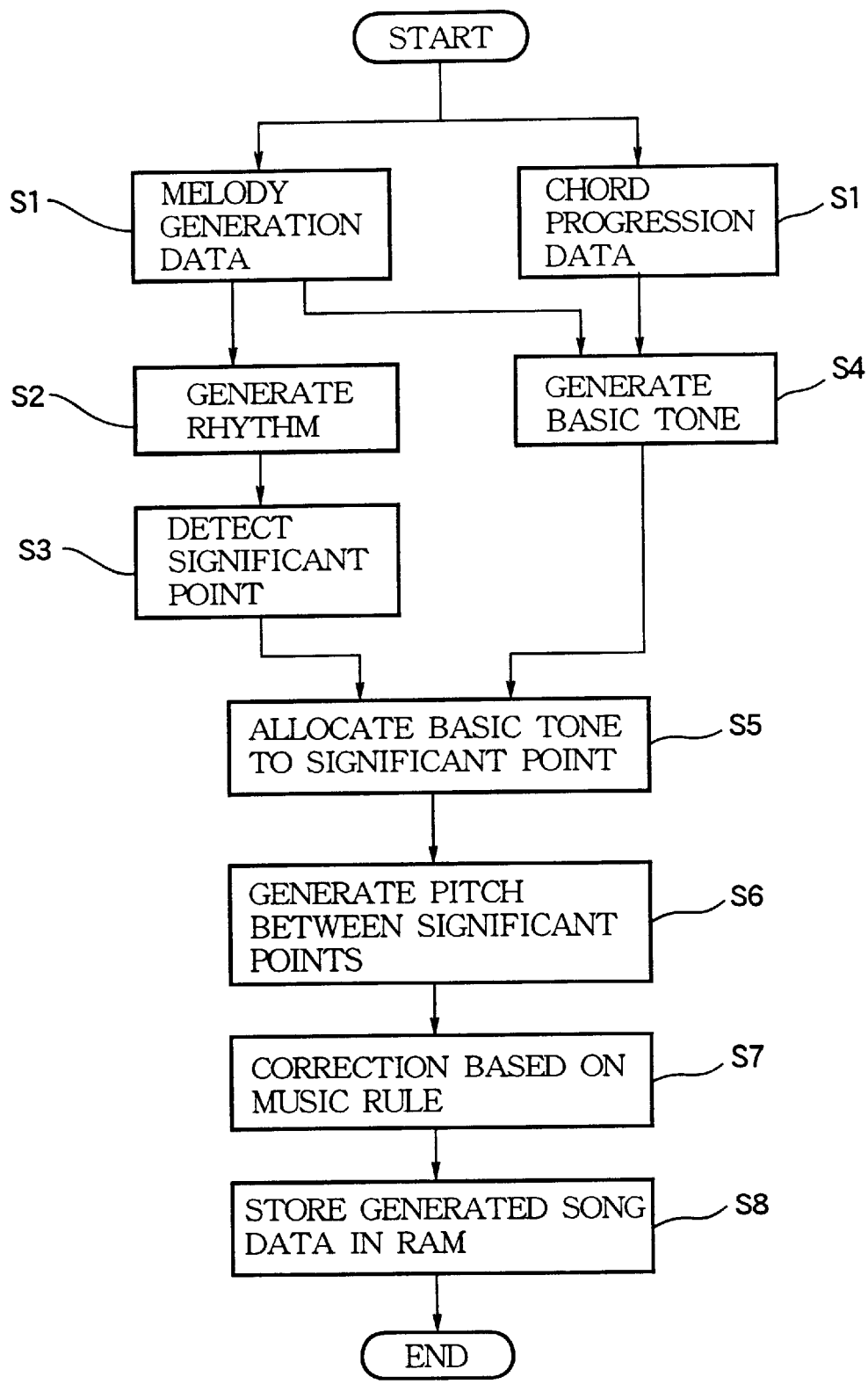
FIG. 2 is a flowchart schematically showing an automatic generation method of song data in the embodiment according to the present invention.

FIG. 2 is a flowchart for schematically illustrating a method for automatically generating song data in the portable communication terminal apparatus according to this embodiment. In this method, song data which suits a user's taste is automatically generated. Therefore, various kinds of melody generation data and chord progression data are previously stored in the ROM 13 or the RAM 14 in accordance with each song feeling. It is to be noted that the melody generation data and the chord progression data may be received from a server through the antenna 20 and the electric wave receiver 21. Alternatively, they may be received from an external device through a non-illustrated communication interface or loaded from a non-illustrated external storage medium (for example, a removable small semiconductor memory card and the like). A pair of melody generation data and chord progression data are selected from various kinds of such data according to a feeling or preference chosen by a user, and a melody is automatically generated based on these data while correcting the data according to a taste or preference of the user. A patent application (Japanese Patent Application Laid-open No. 019625/1999) by the present applicant discloses such automatic generation of a song, e.g., a melody in detail, and automatic generation will be hence roughly described herein.

As feelings of songs, there are various types such as "brisk", "tender", "lonely", "sexy" and others. Various types of melody generation data and chord progression data correspond to respective types of feelings, and any of various types of melody generation data and any of various types of chord progression data corresponding to a chosen feeling type are randomly selected. It is to be noted that one piece of melody generation data and one piece of chord progression data may correspond to feeling type. The melody generation data is composed of rhythm generation data containing a number of musical notes (large, medium and small), a type of beat, presence/absence of syncopation, a number of bars in a song, a musical passage constitution and others, and pitch generation containing an absolute tone-range, a change range of a pitch in a predetermined interval and others. Data representing the chord progression for one complete song (for example, 32 bars) is stored in each chord progression data.

When automatically generating a song, multiple types of feelings are displayed on the display unit 16 in accordance with the operation of a user. When the user selects a congenial feeling type by using the operation switch group 12, a selected pair of melody generation data and chord progression data are read (S1). Based on rhythm generation data included in the read melody generation data, rhythm data (this is data defining positions at which musical notes exist and also referred to as point data) of a motif (for example, a begging part or a theme part of a song) comprised of several bars is first generated, and then rhythm data for one complete song is generated from that motif, the song constitution data and others (S2). For example, as a method for generating a rhythm for one complete song, a musical passage with the same symbol is obtained by using the same rhythm as that of a corresponding musical passage and a musical passage with a similar symbol is obtained by using partially the same rhythm as that of a corresponding musical passage in order to reflect the musical passage symbols. It is to be noted that generation of motif rhythm data is started in accordance with the operation of a predetermined switch (this may be an exclusive switch or a switch commonly used with other functions) in the operation switch group 12. The motif is typically generated by previously stored multiple rhythm patterns (beat point patterns) and then selecting a rhythm pattern matched with the rhythm generation data. If there are multiple candidate rhythm patterns matched with the rhythm generation data, any one may be randomly selected. Alternatively, a rhythm pattern may be selected taking the above-mentioned feeling or a music category which is additionally designated into consideration. Further, the rhythm data of the motif is not only automatically generated, but a user may directly manually input the rhythm data by using the operation switch group 12, or a user may edit the automatically generated rhythm data. A significant beat point is detected from respective beat points of the rhythm data (S3). Here, the significant point is a musically significant note among all the notes constituting the melody. For example, a point at a down beat for each bar, i.e., the first and third beats or a point in the vicinity of the first and third beat is detected as the significant point, and any other point is detected as a non-significant point. Besides the point at the down beat or in the vicinity of the down beat, the significant point may be detected in accordance with any other condition.

On the other hand, basic tones of the motif comprised of several bars are first formed and basic tones of one complete song are then formed by making reference to the basic tones of the motif, the song constitution data and others based on the melody generation data and the chord progression data (S4). As the basic tones of the motif, the tone which is a chord constitution tone and which has the tone-range and a pitch falling within a given pitch range is randomly selected. Besides random selection, the basic tone may be selected in accordance with a predetermined rule. Then, the basic tone is allocated to the detected significant point (S5). Subsequently, a pitch is allocated to a non-significant point between the significant points (S6). A pitch on a scale of available notes for a corresponding chord tone is randomly allocated to the non-significant point. Besides random allocation, the pitch may be allocated in accordance with a predetermined rule. Incidentally, when forming the basic tones for one complete song and the pitch of the non-significant points, the musical passage with the same symbol is obtained by using the same pitch as that of a corresponding musical passage, and the musical passage with the similar symbol is obtained by using partially the same pitch (for example, the first half part) as that of a corresponding musical passage in order to reflect the musical passage symbols as similar to the above-described rhythm case. The thus generated song data is automatically corrected in accordance with a music rule which is additionally stored so as to prevent an unnatural sound (S7), and is then stored in the RAM 14 (S8).

A user may be able to correct the pitch of the significant tone and/or the non-significant tone which has been automatically generated by using the operation switch group 12. Furthermore, the pitch may be corrected only in the motif part or in the entire song. Moreover, the pitch of the entire song is given after generating the rhythm data of the entire song in the above description. However, after generating the rhythm data of the motif, the pitch of the motif may be given, and the rhythm data of the subsequent parts of the song may be then generated. Thereafter, the pitch of the subsequent parts may be given.

In the above-described method for automatically generating the song data, although only the melody part is generated, an accompaniment part may be additionally automatically generated. For example, multiple accompaniment generation data (also referred to as style data which is accompaniment data for one or multiple bars generated in accordance with a predetermined chord type with respect to one or multiple parts) are previously stored in the ROM 13 or the RAM 14 in accordance with each song style, and the accompaniment generation data corresponding to a song style selected by a user using the operation switch group 12 or randomly selected is read outs. Then, the pitch data included in the accompaniment generation data is corrected based on the chord progression data so as to match with the chord progression data, and this process is repeated for one complete song (for example, 32 bars), thereby generating the accompaniment part. It is to be noted that there are an "urbanized" style, an "earthy" style, a "tropical" style, a "danceable" style and others as song styles.

The thus generated melody part (and the accompaniment part) is utilized for applications such as a ringing sound for an incoming call, an alarm sound of a scheduler and the like, a BGM during telephone talking, a BGM in a response message of an automatic telephone message recorder, attachments to an email to be transmitted to the other party, and others.

Figure 3:
FIGS. 3(a) and 3(b) are views showing display examples at the time of generating a rhythm of a motif in the embodiment according to the present invention.
Figure 3:
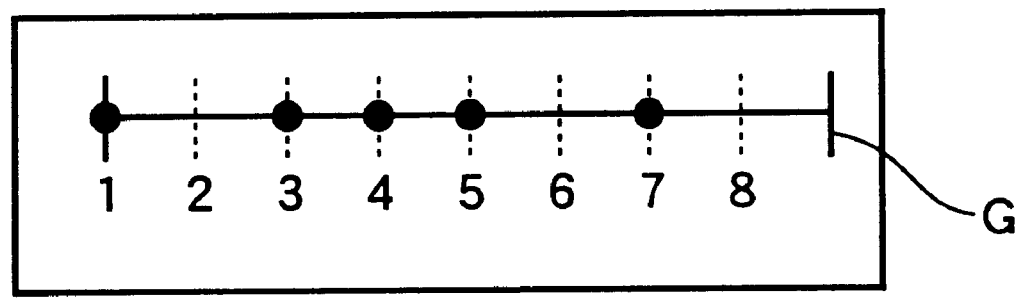

FIGS. 3 are views showing examples of display at the time of motif generation and rhythm generation in particular according to the present embodiment. FIG. 3(a) shows a first display example in case of automatically generating a rhythm (beat points), in which a plurality of (five in this example) generated points are displayed in the form of musical notes. By displaying the rhythm in the form of musical notes in this manner, a user who is familiar with the musical notes can be clearly informed of the generated rhythm. It is to be noted that the points corresponding to the significant sound and the non-significant sound may be distinctively displayed. For example, a predetermined symbol (for example, an underline) may be given to a musical note corresponding to the significant sound, or a color may be changed and displayed in case of a display device capable of effecting color display.

FIG. 3(b) shows a second example of display when the rhythm (a sequence of beat points is automatically generated, in which a grid G indicative of timing in one bar and numeric characters which are arranged in the vicinity of (the lower side in this example) the grid and indicate beat positions in the grid are displayed, and a plurality of (five in this example) generated points are graphic as predetermined graphic elements (black circles in this example) on the grid. It is to be noted that the graphic element representing the beat point is not restricted to the black circle, it may be an outline circle or square. Further, in case of a display device capable of performing color display, a graphic element having a predetermined color may be displayed. As described above, since a position at which a beat point exists is displayed on the grid by using a predetermined graphic element, a user who is not familiar with musical notes can be also clearly informed of the generated rhythm. It is to be noted that the points corresponding to the significant sound and the non-significant sound described above may be distinctively displayed. For example, the point corresponding to the significant sound may be displayed in the form of a black circle, and the point corresponding to the non-significant sound may be displayed in the form of an outline circle. Alternatively, a predetermined symbol (for example, an underline) may be added to the point corresponding to the significant sound.

Figure 4:
FIGS. 4(a) through 4(e) are views showing display examples at the time of generating pitches of a motif in the embodiment according to the present invention.
Figure 4:
Figure 4:
Figure 4:
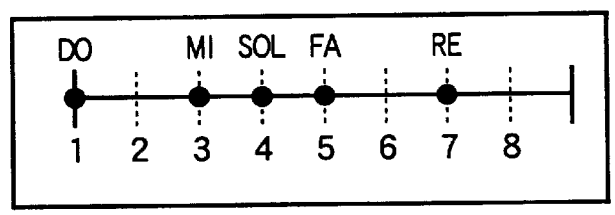
Figure 4:
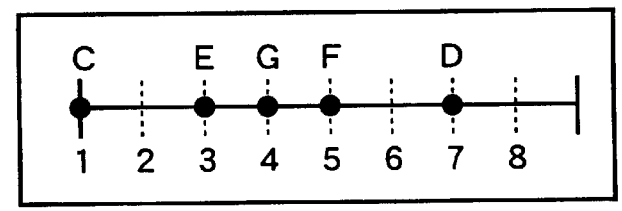

FIGS. 4 are views showing display examples at the time of motif generation and pitch generation in particular according to the present embodiment. FIG. 4(a) shows each point of the already generated rhythm in the form of a musical note, and also shows a generated pitch in the form of a scale name (for example, sol-fa) in association with each musical note. By displaying the rhythm in the form of musical notes and displaying the pitch in the form of the scale name in this way, a user who is familiar with the musical notes can confirm the generated pitch while singing. FIG. 4(b) shows an example in which the points of the already generated rhythm are arranged in the form of musical notes, and also shows the generated pitch in the form of a pitch name (for example, C, D and E) in association with each musical note. By displaying the rhythm in the form of the musical notes and also displaying the pitch by the pitch name, a user who is familiar with the musical notes can confirm the generated pitch while playing a keyboard instrument and the like.

FIG. 4(c) shows an example of display of the beat points of the already generated rhythm in the form of musical notes and display of the pitch in the form of a staff notation. By displaying the rhythm and the pitch in the form of the staff notation in this manner, a user who is familiar with the staff notation can confirm the generated pitch while singing a song or playing a musical instrument.

FIG. 4(d) shows an example of display of each beat point of the already generated rhythm in the form of a grid and display of the generated pitch by a scale name (for example, sol-fa) in association with each beat point. In this way, displaying the rhythm in the form of a grid and displaying the pitch by a scale name enable a user to sing by using a scale name with the timing of beat the points even if he/she can not read the musical notes, and enable to confirm the generated pitch. FIG. 4(e) shows an example of display of each point of the already generated rhythm in the form of a grid and display of the generated pitch by a pitch name (for example, C, D and E) in association with each beat point. In this manner, displaying the rhythm in the form of a grid and displaying the pitch by the pitch name enable a user to play the generated pitch with a keyboard instrument with the timing of the points even if he/she cannot read the musical notes, and enable the user to conform the generated pitch.

Figure 5:
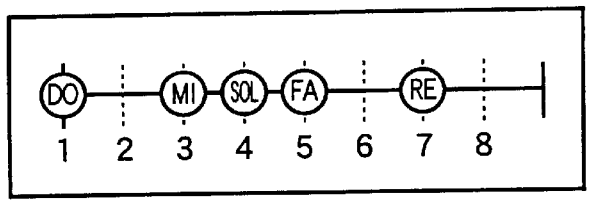
FIGS. 5(a) through 5(e) are views showing display examples at the time of generating pitches of a motif in the embodiment according to the present invention.
Figure 5:
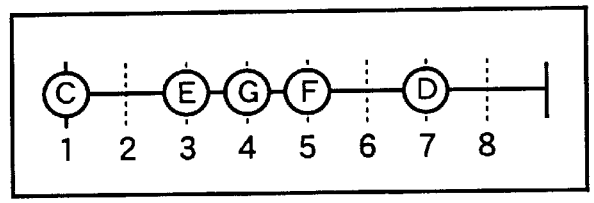
Figure 5:
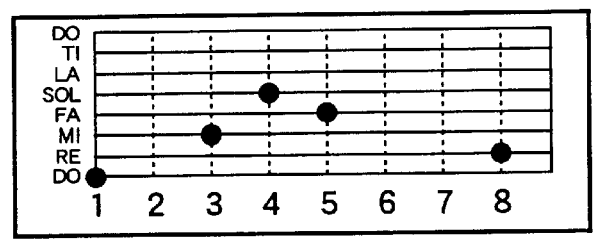
Figure 5:
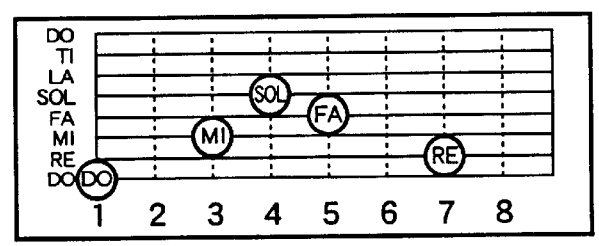
Figure 5:
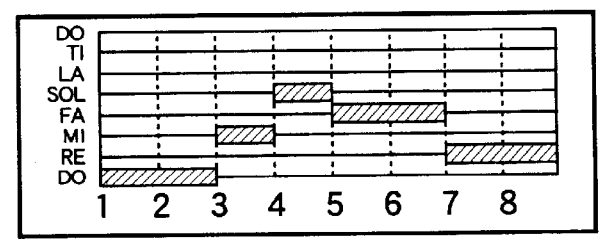

FIG. 5 is views showing examples of display at the time of motif generation and pitch generation in particular according to the present embodiment. FIG. 5(a) shows an example of displaying each point of the already generated rhythm in the form of a grid and a pitch generated on each point by a scale name (for example, sol-fa), and has an advantage similar to that of the example shown in FIG. 4(d). Further, FIG. 5(b) shows an example of displaying each point of the already generated rhythm in the form of a grid and also displaying a pitch generated on each point by a pitch name (for example, C, D and E) and has an advantage similar to that in FIG. 4(e).

FIG. 5(c) shows an example of displaying each point of the already generated rhythm in the form of a grid. Also, in FIG. 5(c), the pitch is represented on the vertical axis and the generated pitch is displayed by a position on the vertical axis. According to this example, a change in pitch can be visually easily grasped. FIG. 5(d) shows an example displaying a scale name on each point in addition to the example of FIG. 5(c). According to this example, a change in pitch can be visually easily grasped and the pitch can be confirmed while singing by using scale names. It is to be noted that display of the pitch names may substitute for display of the scale names.

FIG. 5(e) shows an example of displaying the generated rhythm and pitches in the form of a piano roll. A musical note length at each point is displayed by a bar-like graphic element. Displaying the rhythm and the pitches in the piano roll form in this manner enables a user to also grasp the sound length.

Figure 6:
FIGS. 6(a) through 6(c) show examples of distinctively displaying significant notes and non-significant notes in the display example of a motif in the embodiment according to the present invention.
Figure 6:
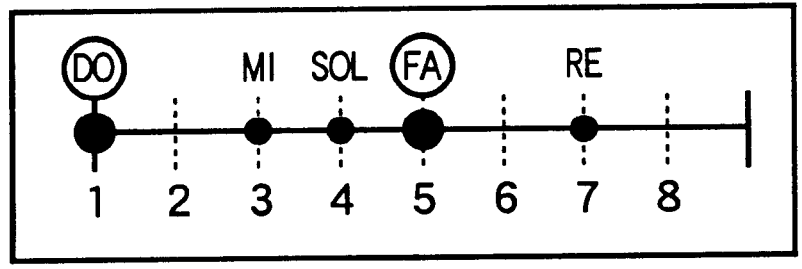
Figure 6:
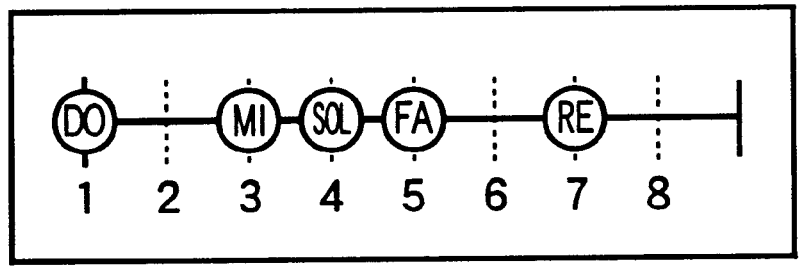

Incidentally, in all the examples shown in FIGS. 4 and 5, the significant sound and the non-significant sound may be distinctively displayed similarly as in the example of FIG. 3. FIGS. 6 show examples in which the significant sound and the non-significant sound are distinctively displayed from each other. FIG. 6(a) shows distinct display of the significant sound and the non-significant sound in the display mode in FIG. 4(a), in which a graphic element (for example, an outline circle) indicative of the significant sound is displayed in a scale name display unit. FIG. 6(b) shows distinct display of the significant sound and the non-significant sound in the display mode in FIG. 4(d), in which a graphic element (for example, an outline circuit) indicative of the significant sound is displayed in the scale name display unit, and sizes of black circles indicative of the points are different between the significant sound and the non-significant sound. Furthermore, FIG. 6(c) shows distinct display of the significant sound and the non-significant sound in the display mode in FIG. 5(a), in which sizes of circles of the points with the scale names are different between the significant sound and the non-significant sound. By distinctively displaying the significant sound and the non-significant sound in this manner, it is possible to recognize the significant sound pitch at a glance.

Figure 7:
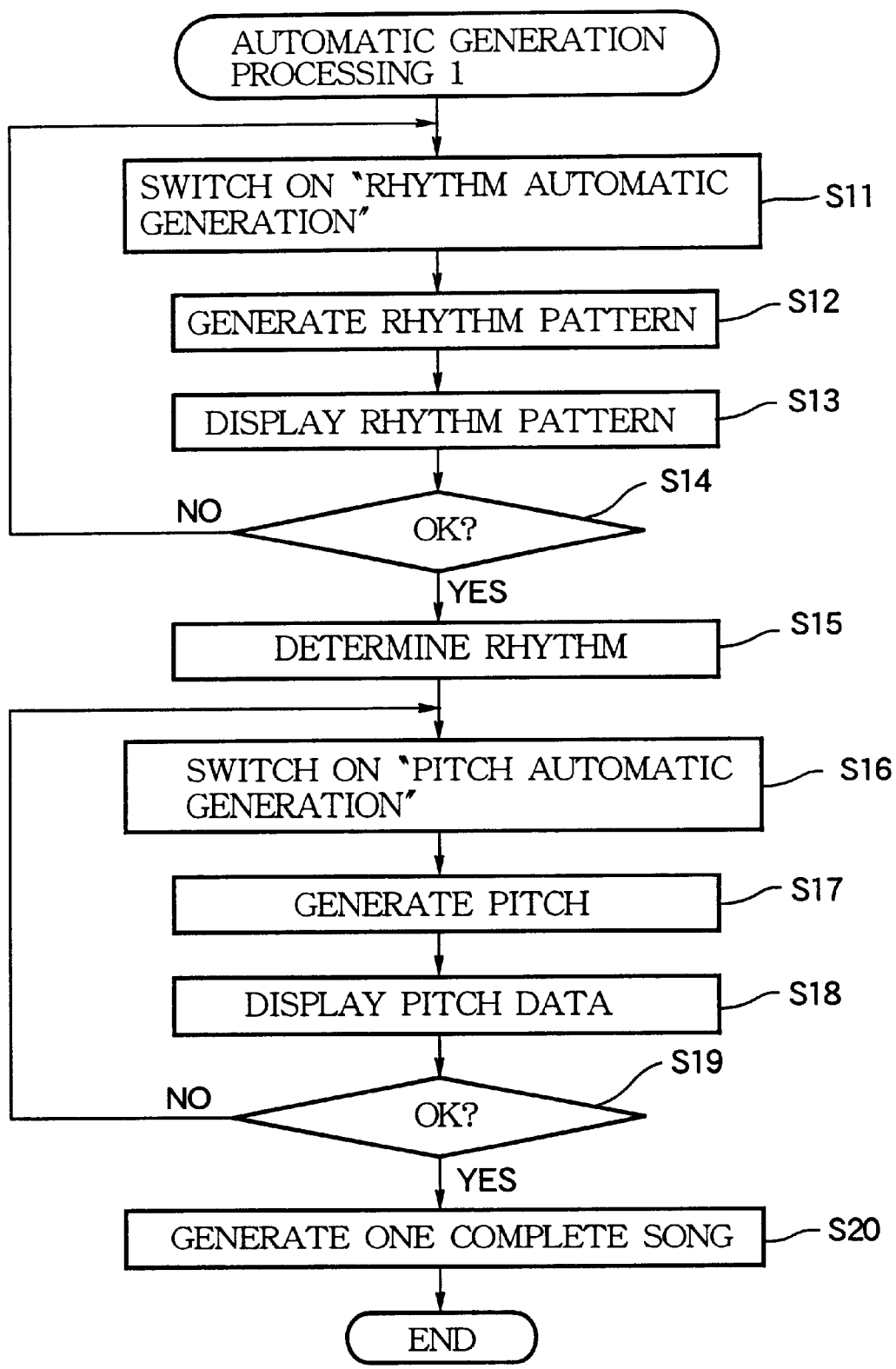
FIG. 7 is a flowchart showing a first example of motif automatic generation processing in the embodiment according to the present invention.

FIG. 7 is a flowchart showing a first example of the motif automatic generation processing, by which the motif rhythm data is first generated and displayed, and then the motif pitch data is then generated and displayed. At first, as described above, when a user turns on a predetermined "rhythm automatic generation" switch in the operation switch group 12 (S11), a motif rhythm pattern is generated based on the selected rhythm generation data (S12). The generated rhythm pattern is displayed as a sequence of musical notes fixed at a predetermined pitch as shown in FIG. 3 or in FIG. 4(c), or as a sequence of points fixed at a predetermined pitch in FIGS. 5(c) to (e) (S13). At this time, a predetermined pitch may be a previously set pitch or a radial pitch of chord progression. It is to be noted that the generated point may be vocalized with a predetermined tone, pitch or tempo according to needs. If a user approves the displayed rhythm pattern, the user indicates OK by operating a predetermined switch (Yes in S14) to determine that rhythm pattern (S15). On the other hand, if the user does not like the displayed rhythm pattern, the process returns to S11 to regenerate the rhythm (No in S14).

When the rhythm pattern is determined, the user turns on a predetermined "pitch automatic generation" switch (S16). In response to this operation, the motif pitch is generated based on the pitch generation data (S17), and the generated pitch is displayed in any mode in FIGS. 4, 5 or 6 (S18). It is to be noted that the generated pitch, i.e., the motif melody may be vocalized with a predetermined timbre and tempo according to needs. If the user approves the displayed pitch, he/she indicates OK by operating a predetermined switch (Yes in S19), and the remaining parts of the rhythm and the pitch are generated, thereby completing one song (S20). On the other hand, if the user does not like the motif melody, the process returns to step S16 to regenerate the pitch (No in S19).

Figure 8:
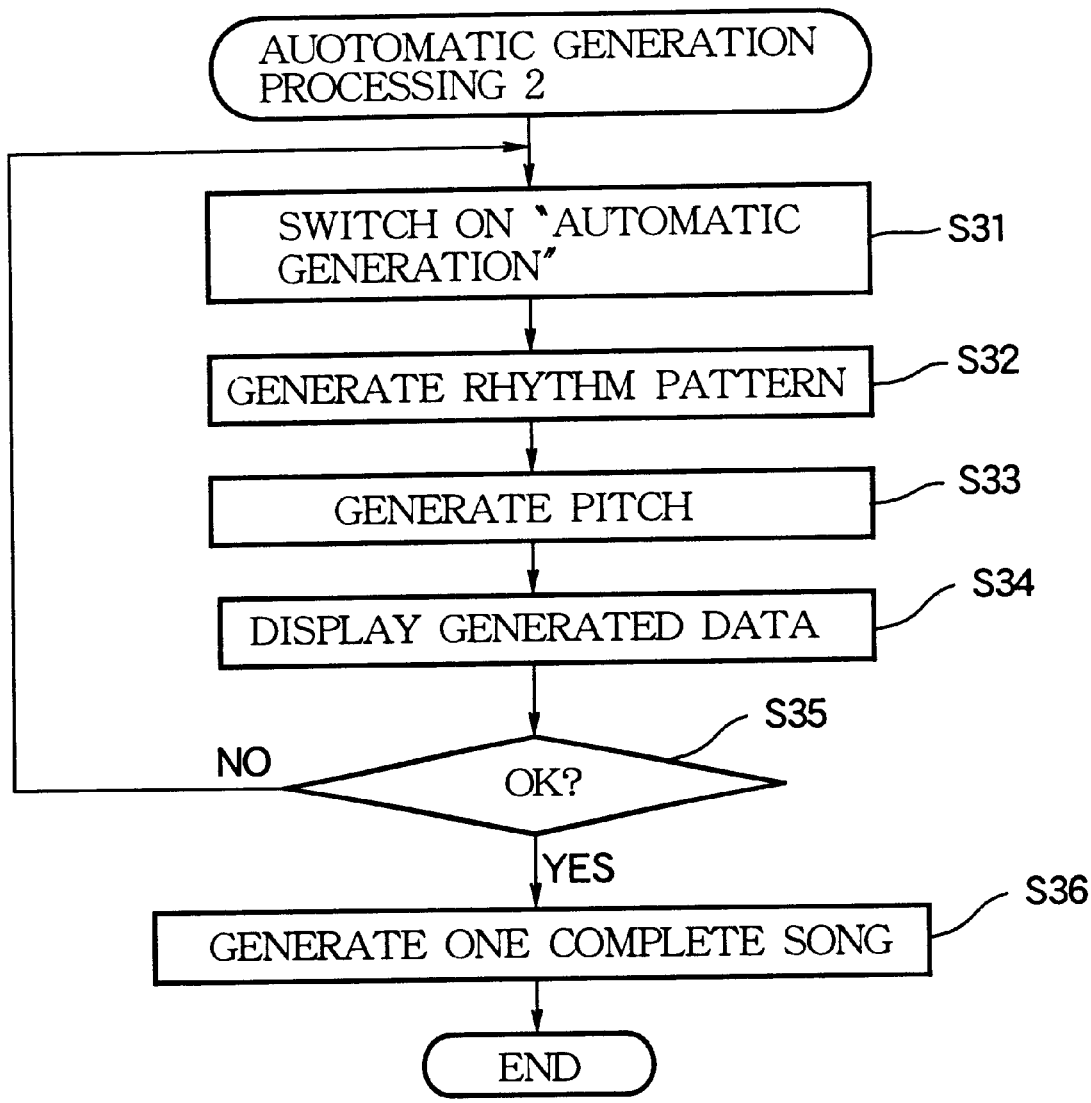
FIG. 8 is a flowchart showing a second example of motif automatic generation processing in the embodiment according to the present invention.

FIG. 8 is a flowchart showing a second example of the motif automatic generation processing, in which a rhythm and a pitch of a motif are simultaneously generated and displayed. At first, when a predetermined "automatic generation" switch is turned on (S31), a motif rhythm pattern is generated based on the selected rhythm generation data (S32), and a motif pitch is then generated based on the pitch generation data (S33). Thereafter, the motif melody comprised of the generated motif rhythm pattern and motif pitch is displayed in any mode as shown in FIGS. 4, 5 or 6 (S34).

The generated motif melody may be vocalized with a predetermined timbre and tempo according to needs. If a user approves the displayed motif melody, the user indicates OK by operating a predetermined switch (Yes in S35), and the remaining part of the rhythm and the pitch is generated, thereby completing one song (S36). On the other hand, if the user does not like the motif melody, the process returns to step S31 to retry the pitch generation (No in S35).

Figure 9:
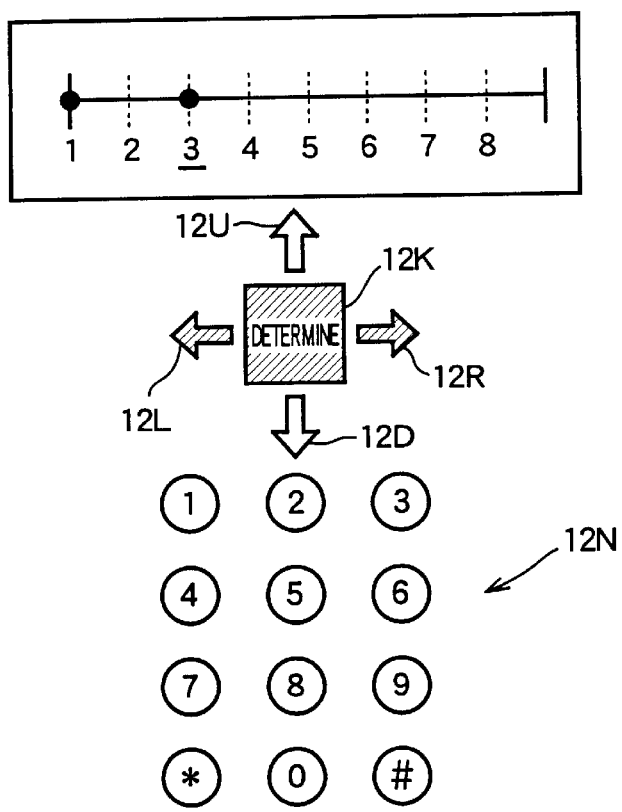
FIGS. 9(a) and 9(b) are views showing display and switch operation examples at the time of manually inputting a beat point on a grid form in the embodiment according to the present invention.
Figure 9:
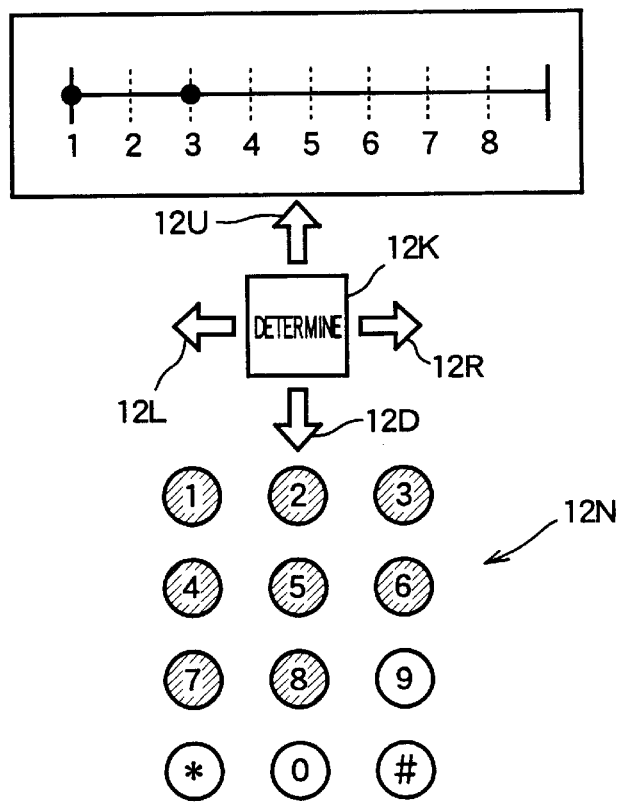

FIG. 9 is views showing examples of display and switch operation when manually inputting a beat point on display in the form of a grid. FIG. 9(a) shows a first example of a beat point input, and there are provided a determination switch 12K, a right arrow switch 12R, a left arrow switch 12L, an up-arrow switch 12U, a down arrow switch 12D, and numeric and symbol switches 12N as a part of the operation switch group 12. A grid position at which a beat point should be inputted is selected (a cursor is displayed) by operating the right arrow switch 12R or the left arrow switch 12L, and the determination switch 12K is operated at the selected position, thereby enabling input of the beat point at that grid position. Moreover, it is possible to move the cursor to the grid position at which the point has been already inputted and to operate the determination switch 12K at that position, thereby deleting the point. The example of FIG. 9(a) shows the state in which the point is inputted at a grid 1 and the cursor is then set at a grid 3, thus inputting the beat point at the grid 3.

FIG. 9(b) shows a second example of the beat point input, in which the provided switches are similar to those shown in FIG. 9(a). In the numeric and symbol switches 12N, numeric switches of 1 to 8 have the relationship of one-to-one correspondence with the first to eighth beats of the grid, and the point is inputted by the operating the numeric switch corresponding to the grid at which the point should be inputted. Additionally, when the numeric switch corresponding to the grid at which the point has been already inputted is operated, the point can be eliminated. The example of FIG. 9(b) shows the state in which the points are inputted at the grids 1 and 3. It is to be noted that both the input method of FIG. 9(a) and the input method of FIG. 9(b) may be used.

FIGS. 10(a) and 10(b) are views showing examples of switch operation when inputting/editing the pitch of the point beat which has been already inputted on the grid type display. The point input method may be automatic generation or manual input. FIG. 10(a) shows the state in which the points are inputted at the grids 1 and 3. The right arrow switch 12R or the left arrow switch 12L is operated to select the grid of the point for which the pitch should be inputted/edited. With the cursor being positioned on the grid at which the point is inputted, the up arrow switch 12U or the down arrow switch 12D is operated, which enables input/edition of the pitch. By the operation of the up arrow switch 12U, the pitch is changed to be higher by a half tone (or changed to be higher by one scale on the available note scale). On the contrary, by the operation of the down arrow switch 12D, the pitch is changed to be lower by a half tone (or changed to be lower by one scale on the available note scale). The change of pitch is started from a predetermined pitch (for example, do) when the up arrow switch 12U or the down arrow switch 12D is operated at the point being inputted. It is started from that pitch if the pitch has been already inputted. In this manner, input/edition of the pitch can be performed by only operating the up arrow switch 12U or the down arrow switch 12D at the point. This input/edition method is not restricted to manual input of the pitch and can be also utilized for editing the automatically generated pitch. Moreover, this method can be used for the pitch input/edition for the significant sound or for the pitch input/edition for the non-significant sound. It is to be noted that this input method may be applied to a display in the musical note form. In such a case, the musical note for which the pitch should be inputted/edited can be selected, and the up arrow switch 12U or the down arrow switch 12D can be operated. In addition, any of methods shown in FIGS. 4(*d*) and 4(*e*), 5 and 6 can be applied as the display mode in the grid form.

Figure 11:
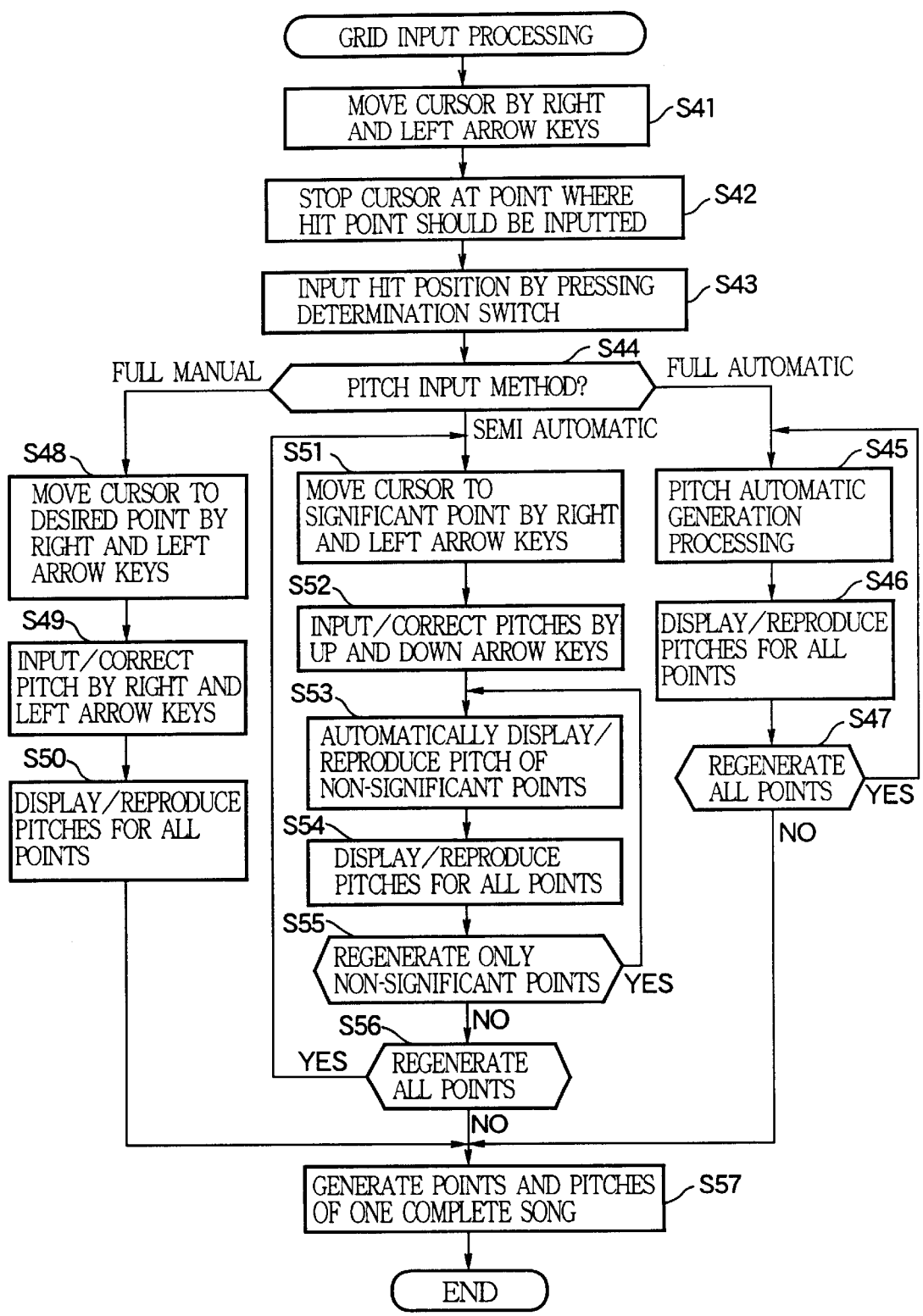
FIG. 11 is a flowchart showing input processing for beats and pitches in the grid form in the embodiment according to the present invention.

FIG. 11 is a flowchart showing processing for inputting a beat point and a pitch on the grid form. Although the fully manual input is shown as the method for inputting the point in this example, this method can be applied to full automation or manual edition after the full automation. The right arrow switch 12R or the left arrow switch 12L is first operated to move the cursor (S41), and the cursor is stopped at a position where the point should be inputted in order to select the grid (S42). The determination switch 12K is pressed at that position to input the point (S43). This processing is carried out with respect to all inputted points. Detection is then made for a pitch input method designated by a user (S44). Incidentally, if only one pitch input method is provided to the portable communication terminal apparatus, this step is eliminated and the sole pitch input method is unconditionally executed.

In case of the fully automatic pitch input method, the pitch is automatically generated by the method described in FIG. 7 or 8 (S45), and the pitches for all the points of the motif are displayed/reproduced (they may be only displayed) (S46). If a user approves the generated motif (N in S47), the points and the pitches of one complete song are generated (S57). On the other hand, if a user does not like the generated motif, the process returns to S45 to restart generation of the pitches for all the points (Yes in S47).

Figure 10:
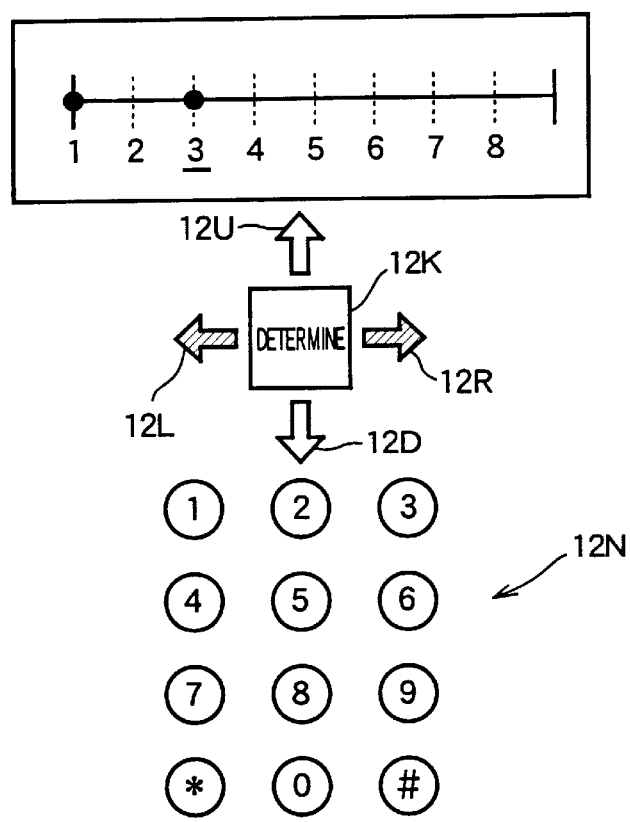
FIGS. 10(a) and 10(b) are views showing switch operation examples when inputting/editing pitches in the grid form in the embodiment according to the present invention.
Figure 10:
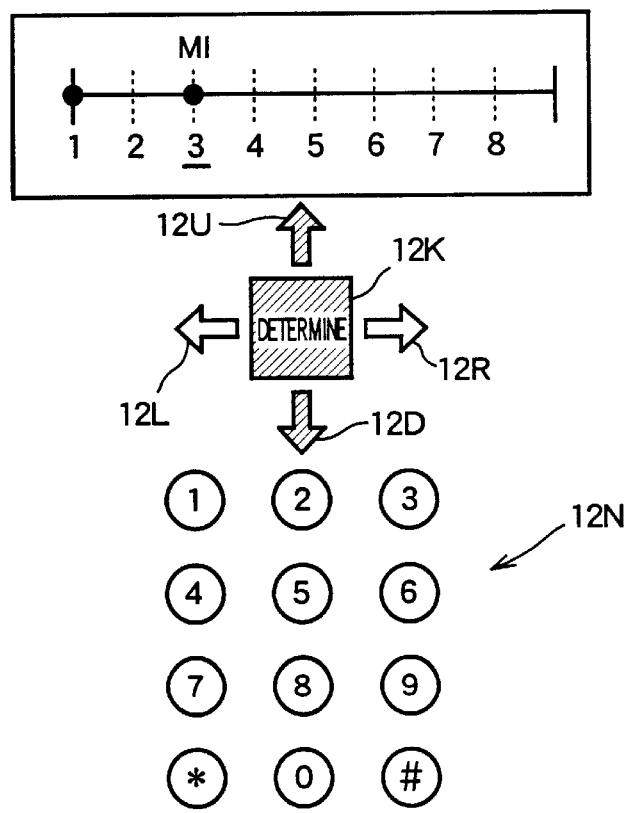

In case of the fully manual pitch input method, the pitches are manually inputted as described in connection with FIG. 10 (S48 to S50), and the process proceeds to step S57. Further, in case of the semi-auto pitch input method by which only the significant points are manually inputted and the non-significant points are automatically generated, the right arrow switch 12R or the left arrow switch 12L is operated to move the cursor to a position of the significant point for which the pitch has been inputted (S51), and the up arrow switch 12U or the down arrow switch 12D is operated to manually input the pitch (S52). Subsequently, the pitches for the non-significant points are automatically generated (S53), and the manually inputted significant point pitches and the generated non-significant point pitches are displayed/reproduced (they may be only displayed) (S54). If a user does not like the pitches for the generated non-significant points, the process returns to step S53 to generate only the non-significant points (Yes in S55). If the user wants to again generate the pitches including the manually inputted significant points (Yes in S56), the process returns to step S51 to restart the pitch input for the significant points and the automatic generation of the non-significant points. If the user approves all the pitches, the process advances to step S57.

Figure 12:
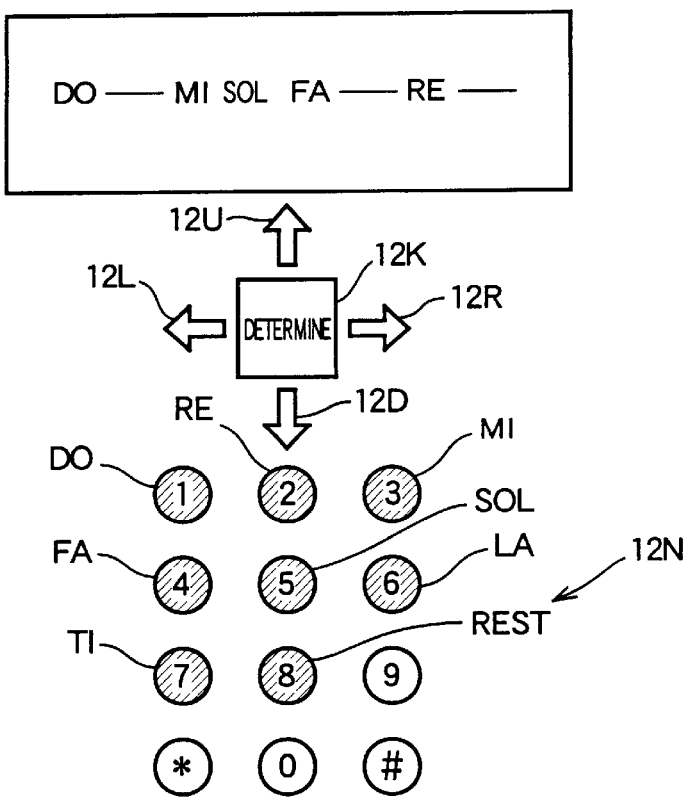
FIGS. 12(a) and 12(b) are views showing examples of displaying rhythm and pitches of a motif by only scale names in the embodiment according to the present invention.
Figure 12:
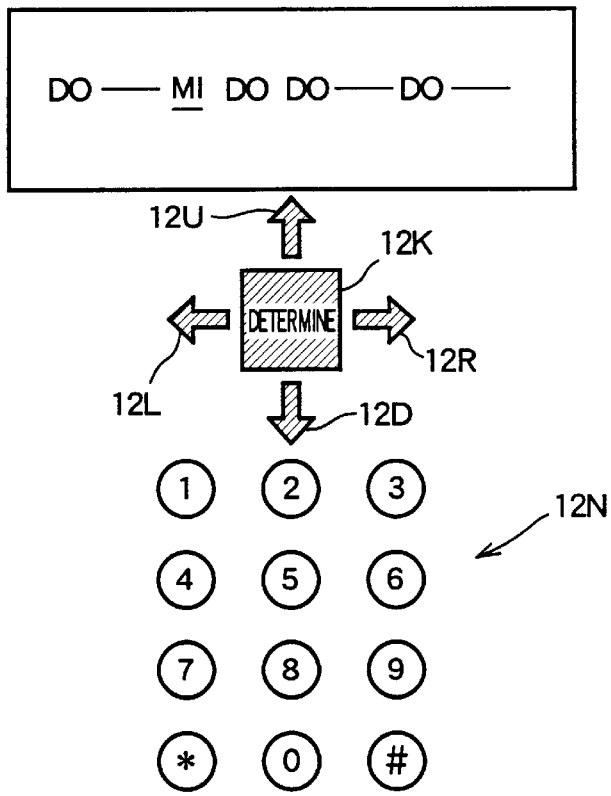

FIGS. 12(*a*) and 12(*b*) are views showing examples of displaying points and pitches of a motif by only scale names without using the musical notes or the grid form described above. FIG. 12(*a*) shows an example that the musical scale is assigned to the numeric and symbol switches 12N, and the pitches are directly inputted by the operation of these switches. Every time each switch is pressed, a beat having a predetermined shortest musical note length (for example, an eighth note) and a pitch corresponding to that switch are inputted. When the same switch is consecutively operated twice or more, the musical note length becomes longer in accordance with a number of times of the operation (for example, the shortest musical note length×the number of times of the operation). If the musical note is lengthened, a graphic element indicating that the musical note is lengthened (for example "-") is displayed next to the scale name. When inputting the exemplified "do, -, mi, sol, fa, -, re, -", the operating "1(do)", "1(do)", "3(mi)", "5(sol)", "4(fa)", "4(fa)", "2(re)" and "2(re)" can suffice. Meanwhile, when continuous input of the musical notes having the same pitch is desired, operating the determination switch K between these musical notes can suffice.

Furthermore, instead of elongating the musical note length in accordance with a number of times of operating the same switch, a function for elongating the musical note length may be allocated to a predetermined numeric switch so that the musical note length can be elongated in accordance with the operation of that switch.

FIG. 12(*b*) shows an example in which only the rhythm is inputted while a pitch is fixed (for example, default do) and the up arrow switch 12U or the down arrow switch 12D is operated to correct the pitch. When the point is inputted by any of the above-described methods, a scale name string including "do" and a graphic element "-" indicative of elongation of the musical note length is displayed. In this example, "do, -, do, do, do, -, do, -" is displayed. Then the cursor is moved to a position at which the pitch should be corrected, and the up arrow switch 12U or the down arrow switch 12D is operated to correct the pitch. In this example, the pitch of the second "do" is corrected to "mi". As described above, when the beat points and the pitches of the motif are displayed by using only the scale names, even a user who cannot read musical notes or does not understand the meaning of display of the grid can sing and confirm the melody of the motif.

Figure 13:
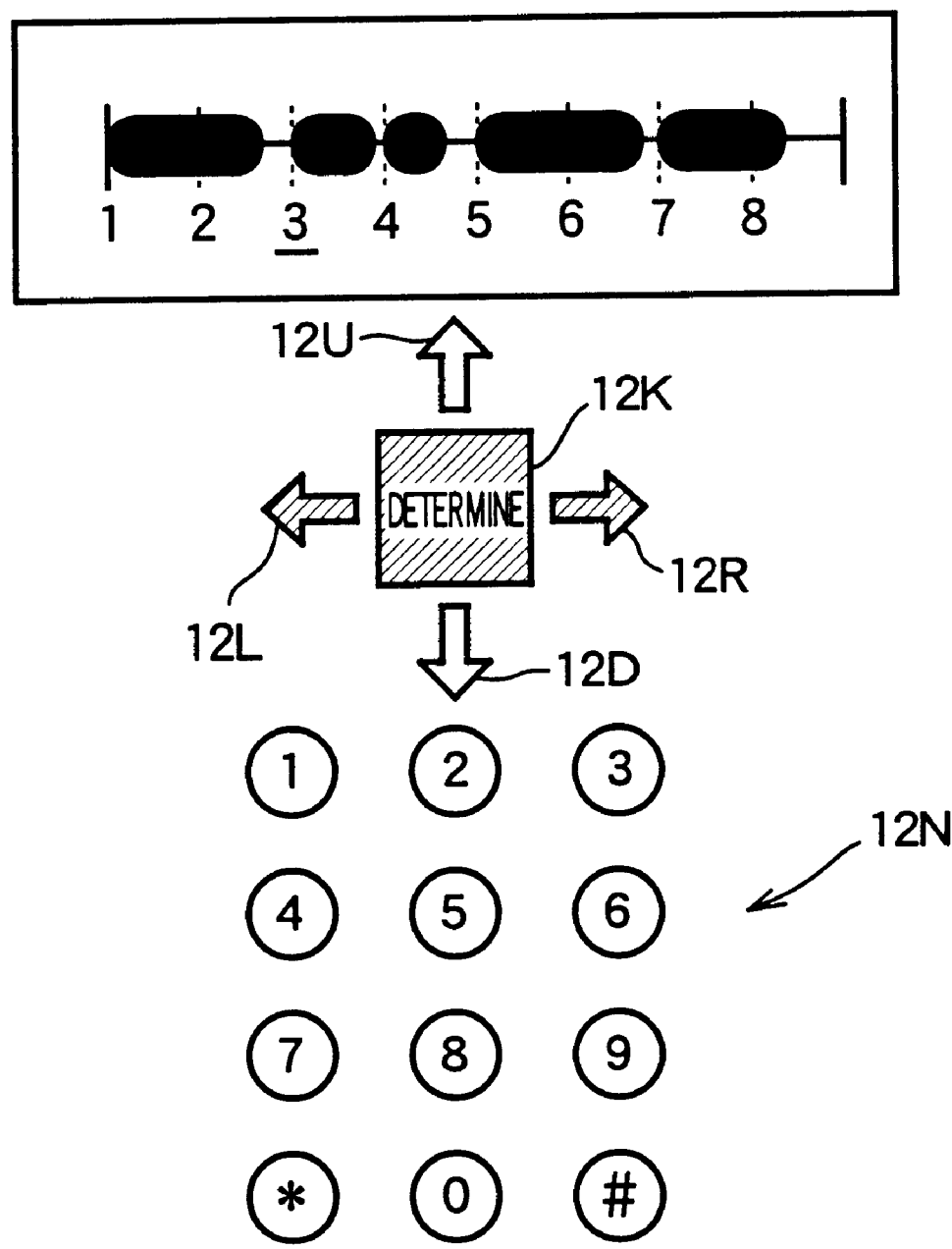
FIG. 13 is a view showing an example of displaying beat points by graphic elements which are flat segments so that a musical note length can be grasped in the grid form in the embodiment according to the present invention.

Incidentally, although the note length of each beat point may be set to the gate time 100% (maintained to a next point) or may be automatically set to a predetermined value (for example, 80%), a user may input the desired note length. In such a case, it is good enough that each point is displayed by using a graphic element of a flat rectangular shape so that the musical note length can be grasped in the grid form as shown in FIG. 13, and the right arrow switch 12R or the left arrow switch 12L and the like can be operated to correct the gate time in accordance with each point. It is needless to say that the numeric switch N and the like can be also used.

Furthermore, the touch panel type display device 16 may be used so that the rhythm or the pitch can be inputted/edited in accordance with a touched position. For example, in FIG. 3(*b*), a position at which a point should be inputted is touched to input the point. Moreover, in FIGS. 4(*d*) and 4(*e*) and FIGS. 5(*a*) and (*b*), a beat point at which the pitch has been inputted is touched, and the pitch is gradually changed by continuously touching the same position, or the pitch is inputted by dragging operation in the upward or downward direction. In FIG. 4(*c*) and FIGS. 5(*c*) and 5(*d*), a desired position is touched to simultaneously input the beat and the pitch. In FIG. 5(*e*), by touching a desired position and by performing the drag operation in the lateral direction, the beat, the pitch and the gate time are simultaneously inputted. Moreover, in FIG. 4(*a*), the musical note length may be inputted by the drag operation in the lateral direction. In addition, the pitch can be designated in the musical note form as similar to the grid form.

It is to be noted that the right arrow switch 12R, the left arrow switch 12L, the up arrow switch 12U and the down arrow switch 12D may be substituted by a joystick type operator capable of designating the upward, downward, rightward and leftward directions in order to enable the similar operation. Additionally, any four of numeric switches may be used for designating the upward, downward, rightward and leftward directions. Further, the various display methods and the operation methods of the operator in this embodiment can be appropriately combined.

As described above, the portable communication terminal apparatus according to the present invention has an advantage that a small display device and a limited number of operators can be used to easily input a motif melody and melody data for one complete song used for signaling an incoming call.

What is claimed is:

1. A portable communication terminal apparatus comprising:
   a transmitter and receiver section that is provided for conducting either of a transmission and receipt of a message;
   a tone generator section that is provided for generating a sequence of tones to sound a music melody of a song in association with either of the transmission and the receipt of the message; and
   a music composing section that is provided for inputting a motif melody comprised of a rhythm and a pitch and for composing the music melody of the song based on the inputted motif melody.

2. The portable communication terminal apparatus according to claim 1, wherein the music composing section includes a rhythm automatic input portion that is provided for automatically inputting the rhythm of the motif melody independently from the pitch of the motif melody.

3. The portable communication terminal apparatus according to claim 2, wherein the music composing section includes a display portion that is provided for displaying the inputted rhythm of the motif melody in a sequence of beat points on either of a musical note form and a grid form.

4. The portable communication terminal apparatus according to claim 3, wherein the music composing section includes a display portion that is provided for displaying the inputted pitch of the motif melody by a scale name or by a pitch name in the vicinity of the displayed rhythm.

5. The portable communication terminal apparatus according to claim 3, wherein the display portion allocates the pitch in a vertical axial direction of the grid form such that the pitch is displayed by a position of the beat point in the vertical axial direction.

6. The portable communication terminal apparatus according to claim 3, wherein the display portion displays a length of each beat point of the rhythm on the grid form.

7. The portable communication terminal apparatus according to claims 3, wherein the rhythm automatic input portion inputs the rhythm constituted by a significant beat point and a non-significant beat point, and the display portion displays the significant beat point and the non-significant beat point distinctively from each other.

8. The portable communication terminal apparatus according to claim 1, wherein the music composing section includes a pitch automatic input portion that is provided for automatically inputting the pitch of the motif melody in correspondence with the rhythm of the motif melody which has been already inputted before the pitch of the motif melody.

9. The portable communication terminal apparatus according to claim 1, wherein the music composing section includes a display portion that is provided for displaying a predetermined musical interval in the form of a grid, and an input portion that is provided with an operating unit for inputting the rhythm by selecting points on the grid.

10. The portable communication terminal apparatus according to claim 9, wherein the input portion further inputs the pitch by selecting the points on the grid with using the operating unit.

11. The portable communication terminal apparatus according to claim 1, wherein the music composing section includes a display portion that is provided for displaying the rhythm of the inputted motif melody in the form of a sequence of points on a grid form which has a predetermined musical interval.

12. The portable communication terminal apparatus according to claim 11, wherein the display portion further displays the pitch of the inputted motif melody by a scale name or a pitch name in the vicinity of the displayed rhythm.

13. The portable communication terminal apparatus according to claim 11, wherein the display portion allocates the pitch in a vertical axis direction of the grid form, such that the pitch of the inputted motif melody is displayed by a position of the point in the vertical axial direction of the grid form.

14. The portable communication terminal apparatus according to claim 1, wherein the music composing section includes a display portion that has a grid for displaying a predetermined musical interval, and a rhythm input portion that is provided with a digit operator corresponding to each point of the displayed grid for inputting the rhythm of the motif melody by designating the points on the grid with the operation of the digit operator.

15. The portable communication terminal apparatus according to claim 1, wherein the music composing section includes a rhythm input portion that is provided with a touch panel type display unit for inputting the rhythm of the motif melody by designating a point on the touch panel type display unit in a horizontal axial direction.

16. The portable communication terminal apparatus according to claim 1, wherein the music composing section includes an input portion that is provided with a touch panel type display unit for inputting the pitch of the motif melody by designating a position on the touch panel type display unit in a vertical axial direction.

17. The portable communication terminal apparatus according to claim 1, wherein the music composing section includes an input portion that is provided with a touch panel type display unit for displaying a staff notation and for inputting the pitch of the motif melody by designating a point on the staff notation displayed on the touch panel type display unit.

18. The portable communication terminal apparatus according to claim 1, wherein the music composing section includes an input portion that is provided with a pitch designation operator for designating the pitch of the motif melody and for inputting both of the pitch and the rhythm of the motif melody based on a predetermined length of a musical note by the sole operation of the pitch designation operator.

19. The portable communication terminal apparatus according to claim 18, wherein the input portion can change the inputted rhythm by lengthening the predetermined length of the musical note in accordance with a number of times of the consecutive operation of the pitch designation operator.

20. The portable communication terminal apparatus according to claim 1, wherein the music composing section includes an input portion that is provided with a rhythm input operator for inputting the pitch and the rhythm of the motif melody in terms of a musical note having a predetermined length by the operation of the rhythm input operator, and a pitch correcting portion that is provided for correcting the inputted pitch.

21. The portable communication terminal apparatus according to claim 20, further comprising a display portion that is provided for displaying a two-dimensional grid such that the rhythm is displayed along a horizontal axis of the two-dimensional grid and the pitch is displayed along a vertical axis the two-dimensional grid, wherein the correcting portion corrects the inputted pitch by changing a position of the displayed pitch along the vertical axis of the two-dimensional grid.

22. A method of operating a portable communication terminal apparatus, comprising the steps of:
conducting either of a transmission and receipt of a message;
generating a sequence of tones to sound a music melody of a song in association with either of the transmission and the receipt of the message;
inputting a motif melody comprised of a rhythm and a pitch; and
composing the music melody of the song based on the inputted motif melody.

23. The method according to claim 22, wherein the step of inputting includes automatically inputting the rhythm of the motif melody independently from the pitch of the motif melody.

24. The method according to claim 22, wherein the step of inputting includes automatically inputting the pitch of the motif melody in correspondence with the rhythm of the motif melody which has been already inputted before the pitch of the motif melody.

25. The method according to claim 22, wherein the step of inputting includes displaying a predetermined musical interval in the form of a grid, and inputting the rhythm by selecting points on the grid with an operating unit.

26. The method according to claim 22, wherein the step of inputting includes displaying the rhythm of the inputted motif melody in the form of a sequence of points on a grid form which has a predetermined musical interval.

27. The method according to claim 22, wherein the step of inputting includes displaying a predetermined musical interval on a grid having a plurality of points, and operating a digit operator corresponding to each point of the displayed grid for inputting the rhythm of the motif melody by designating the points on the grid with the operation of the digit operator.

28. The method according to claim 22, wherein the step of inputting includes operating a touch panel type display unit for inputting the rhythm of the motif melody by designating a point on the touch panel type display unit in a horizontal axial direction.

29. The method according to claim 22, wherein the step of inputting includes operating a touch panel type display unit for inputting the pitch of the motif melody by designating a point on the touch panel type display unit in a vertical axial direction.

30. The method according to claim 22, wherein the step of inputting includes operating a touch panel type display unit for displaying a staff notation and for inputting the pitch of the motif melody by designating a point on the staff notation displayed on the touch panel type display unit.

31. The method according to claim 22, wherein the step of inputting includes operating a pitch designation operator for designating the pitch of the motif melody and for inputting both of the pitch and the rhythm of the motif melody based on a predetermined length of a musical note by the sole operation of the pitch designation operator.

32. The method according to claim 22, wherein the step of inputting includes operating a rhythm input operator for inputting the pitch and the rhythm of the motif melody in terms of a musical note having a predetermined length by the operation of the rhythm input operator, and correcting the inputted pitch by the operation of the rhythm input operator.

33. A machine readable medium for use in a portable communication terminal apparatus having a processor, the medium containing program instructions executable by the processor for causing the portable communication terminal apparatus to perform a process comprising the steps of:
conducting either of a transmission and receipt of a message;
generating a sequence of tones to sound a music melody of a song in association with either of the transmission and the receipt of the message;
inputting a motif melody comprised of a rhythm and a pitch; and
composing the music melody of the song based on the inputted motif melody.

34. The machine readable medium according to claim 33, wherein the step of inputting includes automatically inputting the rhythm of the motif melody independently from the pitch of the motif melody.

35. The machine readable medium according to claim 33, wherein the step of inputting includes automatically inputting the pitch of the motif melody in correspondence with the rhythm of the motif melody which has been already inputted before the pitch of the motif melody.

36. The machine readable medium according to claim 33, wherein the step of inputting includes displaying a predetermined musical interval in the form of a grid, and inputting the rhythm by selecting points on the grid with an operating unit.

37. The machine readable medium according to claim 33, wherein the step of inputting includes displaying the rhythm of the inputted motif melody in the form of a sequence of points on a grid form which has a predetermined musical interval.

38. The machine readable medium according to claim 33, wherein the step of inputting includes displaying a predetermined musical interval on a grid having a plurality of points, and operating a digit operator corresponding to each point of the displayed grid for inputting the rhythm of the motif melody by designating the points on the grid with the operation of the digit operator.

39. The machine readable medium according to claim 33, wherein the step of inputting includes operating a touch panel type display unit for inputting the rhythm of the motif melody by designating a point on the touch panel type display unit in a horizontal axial direction.

40. The machine readable medium according to claim 33, wherein the step of inputting includes operating a touch panel type display unit for inputting the pitch of the motif melody by designating a point on the touch panel type display unit in a vertical axial direction.

41. The machine readable medium according to claim 33, wherein the step of inputting includes operating a touch panel type display unit for displaying a staff notation and for inputting the pitch of the motif melody by designating a point on the staff notation displayed on the touch panel type display unit.

42. The machine readable medium according to claim 33, wherein the step of inputting includes operating a pitch designation operator for designating the pitch of the motif melody and for inputting both of the pitch and the rhythm of the motif melody based on a predetermined length of a musical note by the sole operation of the pitch designation operator.

43. The machine readable medium according to claim 33, wherein the step of inputting includes operating a rhythm input operator for inputting the pitch and the rhythm of the motif melody in terms of a musical note having a predetermined length by the operation of the rhythm input operator, and correcting the inputted pitch by the operation of the rhythm input operator.

* * * * *